United States Patent
Schapel et al.

(10) Patent No.: US 7,464,750 B2
(45) Date of Patent: Dec. 16, 2008

(54) ROTARY FLUID-SEALING STRUCTURE USING SPEED-REDUCTION STAGES

(75) Inventors: Rodney Schapel, Lake Forest, CA (US); John W. Schroeder, Orange, CA (US)

(73) Assignee: Bal Seal Engineering Co., Inc., Lake Forest, CA (US)

( * ) Notice: Subject to any disclaimer, the term of this patent is extended or adjusted under 35 U.S.C. 154(b) by 0 days.

(21) Appl. No.: 11/619,716

(22) Filed: Jan. 4, 2007

(65) Prior Publication Data

US 2007/0158112 A1 Jul. 12, 2007

Related U.S. Application Data

(60) Provisional application No. 60/756,781, filed on Jan. 6, 2006.

(51) Int. Cl.
*E21B 19/00* (2006.01)
(52) U.S. Cl. .................. 166/84.1; 175/195; 475/337
(58) Field of Classification Search ............. 166/84.1, 166/84.4; 175/195; 277/326; 464/163; 475/207, 475/331
See application file for complete search history.

(56) References Cited

U.S. PATENT DOCUMENTS

| | | | | |
|---|---|---|---|---|
| 3,901,330 A | * | 8/1975 | Slator et al. | 173/197 |
| 7,231,969 B2 | * | 6/2007 | Folk et al. | 166/77.51 |
| 2002/0121367 A1 | * | 9/2002 | Meek et al. | 166/78.1 |
| 2003/0205864 A1 | * | 11/2003 | Dietle et al. | 277/434 |
| 2006/0035746 A1 | * | 2/2006 | Griggs et al. | 475/331 |

* cited by examiner

*Primary Examiner*—David J Bagnell
*Assistant Examiner*—Sean D Andrish
(74) *Attorney, Agent, or Firm*—Walter A. Hackler

(57) ABSTRACT

The present invention provides for a rotary fluid-sealing structure for a harsh environment which reduces the PV pressure (×velocity) that a sealing system may be exposed through the use of a rotary speed reducing planetary gear system. The system may have multiple stages with the amount of velocity reduction produced by the system being determined by the number of stages and the planetary gear ratios. Several alternatives are presented for the sealing under extreme conditions such as found in the interface between a wash-pipe and a rotary drilling string in a drilling rig.

12 Claims, 2 Drawing Sheets

ROTARY FLUID-SEALING STRUCTURE USING SPEED-REDUCTION STAGES

The present application claims priority from U.S. Provisional Patent Application Ser. No. 60/756,781 filed Jan. 6, 2006. This document is to be expressly incorporated herein in its entirety by this specific reference thereto.

The present invention generally relates to sealing devices which require added sealing performance and as such particularly applies to severe fluid sealing applications such as, for example, a sealing system or structure for a wash-pipe rotary swivel joint used in oil drilling rig top drives.

The present invention is particularly applicable for rotary sealing systems for sealing drilling mud on land or sea-based drilling platforms. The conditions in this operation include a combination of extremely high pressure, up to 7,500 psi, high-speed up to 2000 fpm and high temperature to 350° Fahrenheit or higher.

Drilling pipe diameters are generally from 3 to 5 inches and as a result of high pressure×velocity (PV) conditions, the life of the sealing system is relatively short and unpredictable.

The present invention includes a sealing structure which provides predictability in seal service life which, in turn, prevents costly unplanned downtime and longer sealing system life by useful factors.

SUMMARY OF THE PREFERRED EMBODIMENTS OF THE INVENTION

A rotary fluid-sealing structure using speed reduction stages in accordance with the present invention generally includes a rotatable lower member, a fixed upper member, and an intermediate rotatable member disposed between the lower and upper members.

A first sealing system is disposed between the lower member and the intermediate member and a second sealing system is disposed between the intermediate member and the upper member.

Means, coupling the lower member and the intermediate member, is provided for causing the intermediate member to have a rotational speed lower than a rotational speed of the lower member in order to reduce speed differential across each of the sealing systems.

In accordance with aspects of the present invention, a plurality of intermediate rotatable members may be sequentially disposed between the lower member and the upper member. Thus, sealing systems disposed between adjacent lower intermediate and upper members are provided with lower or reduced speed differentials there across.

In other aspects of the present invention, a fluid-sealing structure may include a spline driven rotatable lower wash pipe, a fixed upper wash pipe, and an intermediate rotatable wash pipe concentrically disposed with the lower wash pipe and having one end thereof disposed over an end of the lower wash pipe and another end thereof abutting a face of the upper wash pipe.

In yet other aspects of the present invention, a rotary fluid-sealing system is disposed between the lower wash pipe and the intermediate wash pipe and a pressure sealing system is disposed between the intermediate wash pipe and the upper wash pipe.

The pressure sealing systems for the reduced-speed stages could use either of several types of fluid seals including an elastrometric V-type packing or an energized lip-seal of a polymeric type plastic material, etc. For this example, the figure shows a pressure seal-system innovation. At each pressure-seal location is a seal system consisting of two pressure-seals separated by a grease-pack. This configuration provides a means of isolating the harsh sealing challenges of both the abrasive media and the high differential pressure.

In certain preferred embodiments, a sun driving gear is disposed on an outer circumference of the lower wash pipe along with a fixed ring gear and a plurality of planetary spur gears, coupled to the intermediate wash pipe, are disposed between the lower wash pipe driving gear and the ring gear in order to cause the intermediate wash pipe to have a rotational speed lower than a rotational speed of the lower wash pipe to reduce speed differentials across each of the sealing systems. Preferably, a rotational speed experienced by each of the sealing systems is half the rotational speed of the lower wash pipe.

BRIEF DESCRIPTION OF THE DRAWINGS

The advantages and features of the present invention may be more clearly understood by the following detailed description when considered in conjunction with the appended drawings of which.

DETAILED DESCRIPTION

Figure 1:
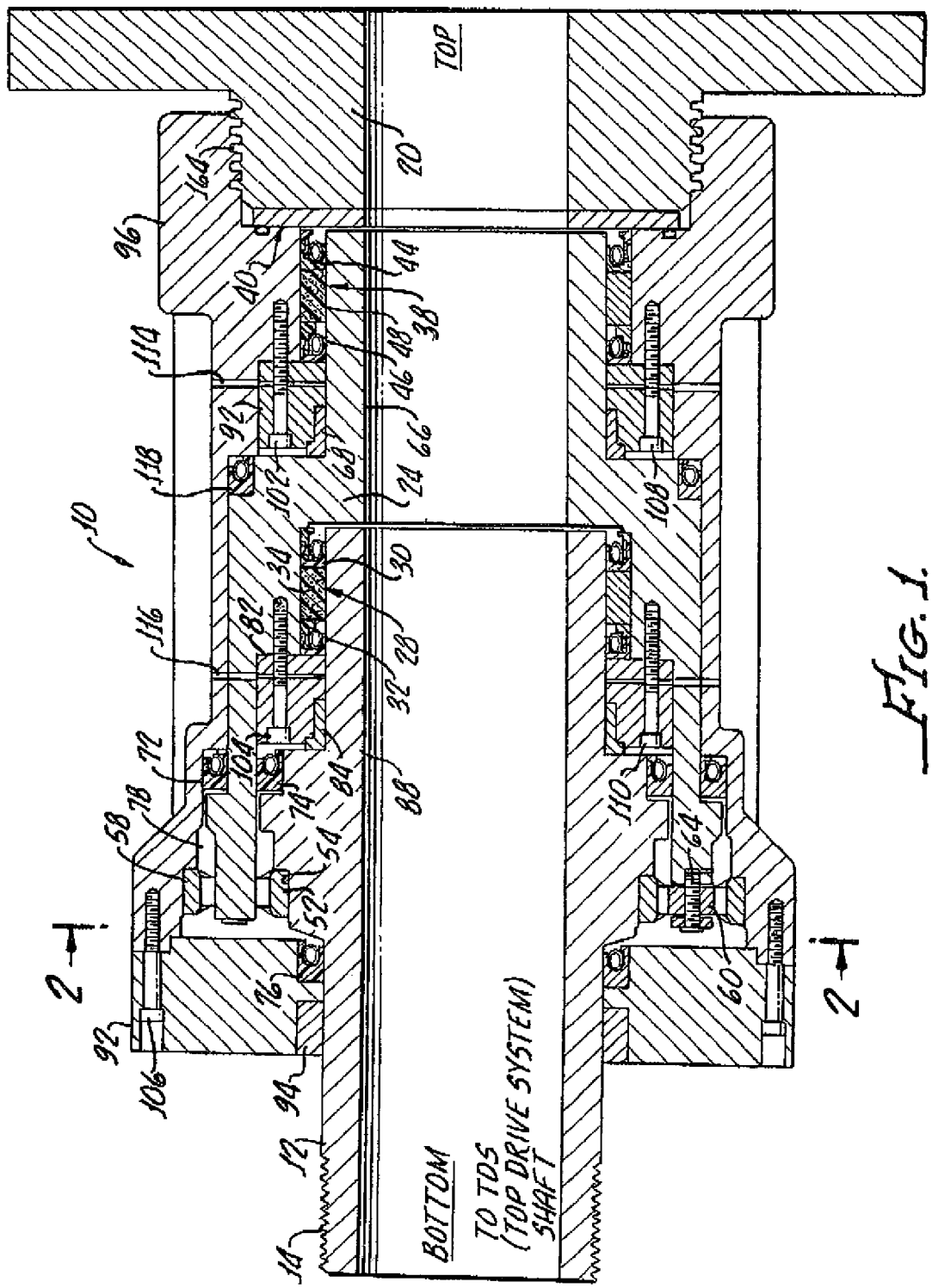
FIG. 1 is a cross sectional view of a rotary fluid-sealing structure using space-reductions stages in accordance with the present invention generally showing a lower member, and intermediate member, and an upper member along with two sealing systems and a sun-driving gear, ring gear with planetary spur gears disposed therebetween.

With reference to FIG. 1, a rotary fluid-sealing structure 10 provided in accordance with aspects of the present invention is shown, which includes a rotatable lower member, or wash pipe, 12 which is driven by a shaft spline 14 for a lower drive collar (not shown) along with a fixed upper member, or wash pipe 20, with an intermediate rotatable member, or wash pipe 24, disposed between the lower wash pipe 12 and upper wash pipe 20 as will be hereinafter described in greater detail. The fluid-sealing structure 10 may be useable with a land or sea-based drilling platform comprising drivers, such as motors and pumps, a rotating drill string, a hoisting structure, and means for circulating drilling fluid.

A first pressure sealing system 28 is disposed between the lower member, or wash pipe, 12 and the intermediate member, or wash pipe, 24. The first sealing system 28, is a media-isolation sealing system and is configured to isolate two harsh conditions of a hard to seal media, i.e. drilling mud that is both abrasive and non-lubricating and a high-pressure differential. The components of the sealing system 28, namely a floating seal 30, a rear seal 32 and a grease pack, or lubricating fluid, 34, are preferably selected to withstand adverse conditions. In operation, the media isolation system functions as follows:

The media pushes on the floating barrier lip seal 30, which is typically a U-cup lip seal that can be spring and media pressure energized. Behind the floating seal 30 is a lubricating fluid 34, usually grease, that transfers pressure to the rear seal 32 and provides lubrication for the sealing system 28 to increase surface life. The floating seal 30 then floats a small distance to maintain the pressure on the grease pack, or lubricating fluid, 34.

A second sealing system 38 is disposed between the intermediate wash pipe 24 and a face 40 of the upper wash pipe 20 and includes a floating seal 44, a rear seal 46, and a grease pack, or lubricating fluid, 48 disposed there between. The second sealing system 38, is a media-isolation sealing system similar to the sealing system 28 described above. The two seal system may be known as pressure seals in the relevant art.

It should be appreciated that while the wash pipe drive system, or structure, 10 is shown with one intermediate wash pipe member 24, an arrangement with multiple identical or similar intermediate wash pipes may be incorporated to further reduce PV values on the seal systems to provide a longer service life, only two seal systems 28, 38 being shown. As further discussed below, a respective epicyclic gearing or planetary gearing system would further reduce the rotational velocity of each successive intermediate wash pipe to thereby reduce the PV values and therefore increase seal performance and seal life.

Figure 2:
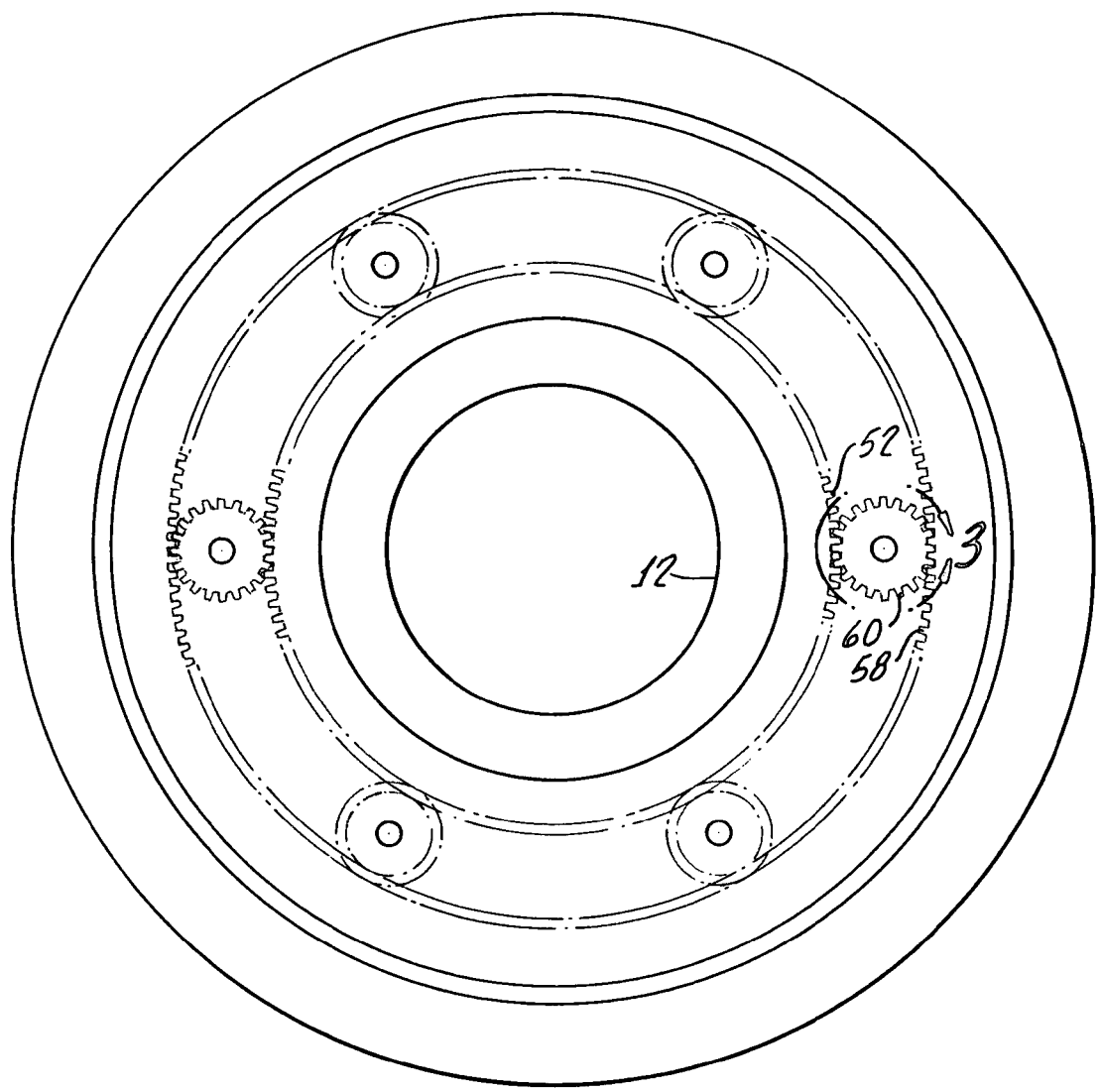
FIG. 2 is a cross sectional view taken along the line 2-2 of FIG. 1 showing the planetary gear system.
Figure 3:
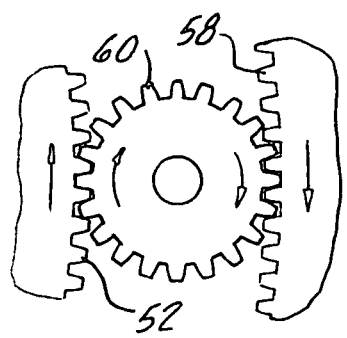
FIG. 3 is a view taken along the line 3 of FIG. 2 illustrating an individual planetary gear engaging the sun-driving gear and the ring gear.

With reference also to FIG. 2, a sun-driving gear 52 is disposed on a circumference 54 of the lower wash pipe 12 along with a fixed ring gear 58 and a plurality of planetary spur gears 60 provide a means, coupling the lower wash pipe 12 and the intermediate member pipe 24, for causing the intermediate wash pipe 24 to have a lower rotational speed than a rotational speed of the lower wash pipe in order to reduce speed differentiation across each of the sealing systems 28, 38.

It should be appreciated that while a geared system is provided for coupling the lower wash pipe 12 and the intermediate wash pipe 24 for exemplary purposes, the drive system could incorporate any of several drive mechanisms or means (not shown) such as chains, belts, other mechanical drive systems, an electric motor system, a hydraulic motor system or pneumatic motor system. All of these couplings for reducing the speed between the lower wash pipe 12 and intermediate wash pipe 24 are to be considered within the scope of the invention.

In accordance with the present invention, the intermediate wash pipe 24 rotates at a reduced speed, perhaps 50 percent, relative to the lower wash pipe rotation and thus the two sealing systems 28, 38 will experience lower speed differential there across, which provides for reduced PV values and therefore an increase in seal service life.

In operation, the sun-drive gear 52 meshes with the planetary spur gear 60, which in turn meshes with the fixed ring gear 58 to obtain a speed reduction that is determined by the gear ratios. The spur gear 60 may be coupled with the intermediate wash pipe 24 by pins 64.

More particularly, the intermediate wash pipe 24 may be supported at an upper end 66 by a bushing 68 and a plurality of spring energized lip seals 72, 74, 76 Lubricating oil is provided in a cavity 78 for lubricating the drive gear 52, ring gear 58, and plurality of planetary gears 60.

The sealing system 28 bears against a retaining ring 82 which provides a fixture for supporting a bushing 84 for a lower portion 88 of the intermediate wash pipe 24. Similarly, a retaining ring 92 supports a bushing 68, and retaining ring 119 supports a bushing 94.

The structure 10 is assembled with a wash pipe top nut 96 screwed to threads 100 on the fixed upper wash pipe 20 along with bolts 102, 104, 106, 108, 110. Relief ports 114, 116 are provided to divert any media leakage, which eventually migrates past the pressure seals, away from any critical components such as the centering bushings 68, 84 and the planetary gear 60. Spring energized low friction lip seals 72, 74, 118 are placed, as shown, to confine any leakage from the sealing system to the relief ports 114, 116.

Although there has been hereinabove described a specific rotary fluid-sealing structure using speed-reduction stages in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims. As examples, grease ports may be incorporated to replenish the grease packs, each sealing system may include multiple seals having multiple grease packs positioned there between to gradually reduce the seal back pressure for the subsequent seal stages, and using split-housings where applicable for ease of maintenance and repairs, just to name a few.

What is claimed is:

1. A rotary fluid-sealing structure comprising:
a rotatable lower member; a fixed upper member; an intermediate rotatable member disposed between the lower and upper members; a first sealing system disposed between the lower member and the intermediate member; a second sealing system disposed between the intermediate member and the upper member; each sealing system comprising two pressure seals separated by a lubricating fluid; means, coupling the lower member and the intermediate member, for causing the intermediate member to have a rotational speed lower than a rotational speed of the lower member; and relief ports associated with each sealing system for diverting media leakage exterior to the structure.

2. The structure according to claim 1, wherein the means for causing the intermediate member to have a lower rotational speed comprises a planetary gearing system.

3. A rotary fluid-seal structure comprising:
a rotatable lower member connected to a land or sea-based drilling platform; a fixed upper member; an intermediate rotatable member disposed between the lower and upper members; a first sealing system disposed between the lower member and the intermediate member; a second sealing system disposed between the intermediate member and the upper member; and means, coupling the lower member and the intermediate member, for causing the intermediate member to have a rotational speed lower than a rotational speed of the lower member.

4. A rotary fluid-sealing structure comprising:
a rotatable lower member; a fixed upper member; an intermediate rotatable member disposed between the lower member and the upper member; a plurality of sealing systems disposed between adjacent lower, intermediate, and upper members; each sealing system comprising a plurality of pressure seals separated by a lubricating fluid; means, coupling each of the lower and intermediate members, for causing the members to have progressively lower rotation speeds than a rotating speed of the lower member; and relief ports associated with each sealing system for diverting media leakage exterior to the structure.

5. The structure according to claim 4, wherein the means for causing the members to have progressively lower rotational speeds comprises a planetary gearing system.

6. The structure according to claim 4, wherein each sealing system comprises two pressure seals separated by a lubricating fluid.

7. A rotary fluid-sealing structure comprising:

a rotatable lower member; a fixed upper member; an intermediate rotatable member concentrically disposed with the lower member and having one end thereof overlapping an end of the lower member and another end proximate the upper member; a first sealing system disposed between the lower member and the intermediate member; a second sealing system disposed between the intermediate member and the upper member; a sun driving gear disposed on an outer circumference of the lower member end; a fixed ring gear disposed in a spaced apart relationship with the driving gear; and a plurality of planetary spur gears coupled for rotating with the intermediate member and engaging both the driving gear and the ring gear to cause the intermediate member to have a rotational speed lower than a rotational speed of the lower member.

8. The structure according to claim 7, wherein each sealing system comprises two pressure seals and a lubricating fluid.

9. The structure according to claim 7, further comprising relief ports associated with each sealing system for diverting media leakage exterior to the structure.

10. A rotary fluid-sealing structure using speed-reduction stages comprising:

a rotational lower wash pipe; a fixed upper wash pipe; an intermediate rotatable wash pipe concentrically disposed with the lower wash pipe and having one end therewith disposed over an end of the lower wash pipe and another end adjacent a face of the upper wash pipe; and a rotary fluid sealing system disposed between the lower wash pipe and the intermediate wash pipe; a media-isolation sealing system disposed between the intermediate wash pipe and the upper wash pipe; a sun driving gear disposed on an outer circumference of the lower wash pipe; a fixed ring gear disposed in a spaced apart relationship with the drive gear; and a plurality of planetary spur gears coupled for rotation with the intermediate wash pipe and engaging both the driving gear and said ring gear to cause the intermediate wash pipe to have a rotational speed lower than a rotational speed of the lower wash pipe.

11. The structure according to claim 10, wherein each sealing system comprises two pressure seals and a lubricating fluid.

12. The structure according to claim 10, further comprising a relief port associated with the sealing system for diverting media leakage exterior to the structure.

* * * * *